United States Patent [19]
Burgess et al.

[11] Patent Number: 5,458,746
[45] Date of Patent: Oct. 17, 1995

[54] PROCESS FOR MAKING COPPER METAL POWDER, COPPER OXIDES AND COPPER FOIL

[75] Inventors: David P. Burgess, Mentor, Ohio; Wendy M. Gort, Winkelman, Ariz.; Ronald K. Haines, Mentor, Ohio; Jackson G. Jenkins, Oracle; Stephen J. Kohut, Chandler, both of Ariz.; Peter Peckham, Concord, Ohio

[73] Assignees: Magma Copper Company; Gould Electronics Inc.

[21] Appl. No.: 287,703

[22] Filed: Aug. 9, 1994

Related U.S. Application Data

[63] Continuation of Ser. No. 49,160, Apr. 19, 1993, abandoned.

[51] Int. Cl.$^6$ .................................................. C25C 1/12
[52] U.S. Cl. ........................... 204/106; 204/108; 205/74; 75/712; 75/753
[58] Field of Search ........................ 204/106; 205/74; 75/753

[56] References Cited

U.S. PATENT DOCUMENTS

| | | | |
|---|---|---|---|
| 1,058,048 | 4/1913 | Gibbs . | |
| 1,959,376 | 5/1934 | Lucas | 264/1 |
| 2,053,222 | 9/1936 | Lucas | 204/5 |
| 3,148,130 | 9/1964 | Brace et al. | 204/96 |
| 3,282,682 | 11/1966 | Harlan | 75/117 |
| 3,535,218 | 10/1970 | Brown et al. | 204/108 |
| 3,556,957 | 1/1971 | Toledo et al. | 204/32 |
| 3,616,277 | 10/1971 | Adamson et al. | 204/10 |

(List continued on next page.)

OTHER PUBLICATIONS

Search Report for PCT Application No. PCT/US94/02867, mailed Jun. 17, 1994.
Argall, "Copper Oxide to Copper Cathode", *World Mining*, Aug., 1976, pp. 48–51.
Bucci et al, "Copper Foil Technology", PC Fab, Jul. 1986, pp. 22–31.

(List continued on next page.)

*Primary Examiner*—John Niebling
*Assistant Examiner*—Brendan Mee
*Attorney, Agent, or Firm*—Michael A. Centanni

[57] ABSTRACT

This invention is directed to a process for making copper metal powder from copper-bearing material, comprising: (A) contacting said copper-bearing material with an effective amount of at least one aqueous leaching solution to dissolve copper ions in said leaching solution and form a copper-rich aqueous leaching solution; (B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution, said extractant comprising (i) at least one oxime characterized by a hydrocarbon linkage with at least one —OH group and at least one =NOH group attached to different carbon atoms on said hydrocarbon linkage, (ii) at least one betadiketone, or (iii) at least one ion-exchange resin; (C) separating said copper-rich extractant from said copper-depleted aqueous leaching solution; (D) contacting said copper-rich extractant with an effective amount of at least one aqueous stripping solution to transfer copper ions from said extractant to said stripping solution to form a copper-rich stripping solution and a copper-depleted extractant; (E) separating said copper-rich stripping solution from said copper-depleted extractant to form a first electrolyte solution; (F) advancing said first electrolyte solution to an electrolytic cell equipped with at least one first anode and at least one first cathode, and applying an effective amount of voltage across said first anode and said first cathode to deposit copper metal powder on said first cathode; and (G) removing copper metal powder from said first cathode. In one embodiment the copper metal powder is converted to copper foil. In one embodiment the copper metal powder is converted to cuprous oxide, cupric oxide or a mixture thereof; these copper oxides can be readily dissolved in sulfuric acid and used to make copper foil.

37 Claims, 2 Drawing Sheets

U.S. PATENT DOCUMENTS

| | | | |
|---|---|---|---|
| 3,661,740 | 5/1972 | Brace et al. | 204/96 |
| 3,681,056 | 8/1972 | Lyon et al. | 75/108 |
| 3,844,763 | 10/1974 | Burkin | 75/0.5 A |
| 4,023,964 | 5/1977 | De Matthe et al. | 75/101 R |
| 4,028,199 | 6/1977 | Holland | 204/10 |
| 4,030,990 | 6/1977 | Piret et al. | 204/108 |
| 4,069,119 | 1/1978 | Wong | 204/106 |
| 4,133,746 | 1/1979 | Dopson | 209/1 |
| 4,150,976 | 4/1979 | Dain | 75/117 |
| 4,193,846 | 3/1980 | Barrett | 204/13 |
| 4,484,990 | 11/1984 | Bultmen et al. | 204/106 |
| 4,544,460 | 10/1985 | Ochs | 204/107 |
| 4,561,887 | 12/1985 | Domic et al. | 75/65 R |
| 4,874,534 | 10/1989 | Sorensen et al. | 210/803 |
| 4,956,053 | 9/1990 | Polan et al. | 204/13 |
| 4,957,714 | 9/1990 | Olafson et al. | 423/24 |

OTHER PUBLICATIONS

Coppertron, "An Installation for and Method of Electrolytic Production of Copper Foils", British Patent 1,588,681 (Apr., 1981), Abstract 24051.

Eamon et al, "Plant Practices & Innovations", TMS Symposium, New Orleans, La., Feb. 1991, pp. 1–17.

Enchev et al, "Production of Copper Powder by the Method of Electrolytic Extraction Using a Reversing Current", *Sov. Powder Met. & Met. Ceramics*, V. 13, No. 9 (Sep. 1974), Translation by Plenum Publishing Corp. (1975), pp. 764–766.

Harper et al, "The Electrodeposition of Copper Powder With the Aid of Surfactants", Refinery and Mill Operations—Part I, CDA-ASM Conference, Oct., 1972, Cleveland, Ohio.

Jayaweera et al, "Purification of Copper Amine Solution During the Production of Copper Oxide", Chemeca 86, 14th Aust. Chem. Engr. Conf. (1986), pp. 95–100. Month not available.

Klar, "Production of Copper by the Reduction of Copper Oxide", Metals Handbook, Ninth Edition, vol. 7, pp. 105–120. Jun., 1984.

Kordosky, "Copper Solvent Extraction: The State of the Art", JOM, May 1992, pp. 40–45.

Magma Copper Company, Pamphlet entitled "SX-EW/Solvent Extraction-Electrowinning". No date available.

Makowski et al, "Properties of Electrodeposited Foils for Use in Printed Circuits", *Symposium on Electrodeposited Metals as Materials for Selected Applications*, Battelle, Columbus, Ohio, (Jan., 1972), pp. 14–31, Abstract 17448.

Singh et al, "A Continuous & Self Regulating Method for Making Copper Powder by Electrolysis", NML Technical Journal, vol. 17, Feb.–May 1975, pp. 23–26.

Taubenblat, "Electrodeposition of Metal Powders", *Metals Handbook Ninth Edition*, vol. 7. Jun., 1984.

Townson et al, "The Solvent Extraction of Copper–a Perspective", Reprinted for *Mining Journal Limited*, London. No date available.

Usol'tseva et al, "Electrodeposition of Fine Copper Powders in the Presence of Organic Additions", Plenum Publishing Corporation, (1983), pp. 610–613, Translation from Poroshkovauh Metallurgiga, No. 8 (248) pp. 16–20, Aug. 1983.

Walker, et al, "The Morphology and Properties of Electrodeposited Copper Powder", *Surface Technology*, 23 (1984) pp. 301–321. Month not available.

Williams, "Copper Powder Production at Nordduetsche Affinerie", MPR, Jan. 1989.

"The Economics of Pressing Grade Copper Powder Production", MPR, May 1984, pp. 251–255.

"Non–Ferrous Powder Production at Makin", MPR, Jan. 1987, pp. 15–20.

"Electrowon Cathode Takes Growing Share of Wiremill Market", Copper Studies, vol. 18, No. 10, Apr. 1991, pp. 7–12.

Walker et al, "The Stabilization of Electrodeposited Copper Powder", *Surface and Coatings Technology*, 27 (1986), pp. 137–144.

Walker et al, "The Morphology and Properties of Electrodeposited Copper Powder," *Surface Technology*, 23 (1984), pp. 301–321.

CA Abstract AN 120:139794 V. Travkin, "Effect of Additives . . .", *Tsvetn. Met.* (Moscow) (1993).

CA Abstract AN 93:174647 G. A. Yagodin, "Study of the extraction of copper . . . ", *Izv. Vyssh. Uchebn. Zaved. Khim. Tekhnol.* (1980).

CA Abstract AN 97:96033 R. D. Allabergenov, et al., "Extraction of Copper . . .", *Uzb. Khim. Zh.* (1982).

PROCESS FOR MAKING COPPER METAL POWDER, COPPER OXIDES AND COPPER FOIL

This is a continuation of application Ser. No. 08/049,160 filed on Apr. 19, 1993 now abandoned.

TECHNICAL FIELD

This invention relates to a process for making copper metal powder, copper oxides or copper foil. More particularly, this invention relates to a process using an extractant for extracting copper from copper-bearing materials and making copper metal powder, copper oxides or copper foil.

BACKGROUND OF THE INVENTION

The process for recovery of copper metal values from ores and processing liquids by solvent extraction-electrowinning (hereafter, "SX-EW") is well-known. Briefly, the process is carried out using a copper-bearing aqueous solution which is obtained by dissolving (generally from an ore) the copper in an aqueous reach liquor, or by using a copper-bearing solution such as process effluent. The resulting solution of copper values is mixed with a water-immiscible organic solvent (e.g., kerosene) containing a water-insoluble ion exchange composition having selective affinity for the copper values. The ion exchange composition preferentially extracts the copper values from the aqueous solution. The aqueous and organic phases are separated. The aqueous solution, now copper-depleted, is usually referred to as "raffinate." The raffinate can be recycled as leach liquor (in a leaching process) or discarded (in a process such as recovery of copper from process effluent). The organic phase (which contains ion exchange composition and the extracted copper values) is usually referred to as "loaded organic." The desired copper values are removed from the loaded organic by mixing with an aqueous strip solution containing strong acid such as sulfuric, phosphoric, or perchloric acid, and having lower pH than the above copper-bearing aqueous solution. The aqueous strip solution extracts the desired copper values from the traded organic. After separation of the organic and aqueous phases, the desired copper values are present in the aqueous strip solution. The resulting copper-rich aqueous strip solution is usually referred to as an "electrolyte" or "rich electrolyte." The copper-depleted organic phase is usually referred to as a "barren organic." The barren organic can be recycled.

Copper is recovered in purified form from the electrolyte by a technique known as "electrowinning" (hereafter sometimes referred to as "EW"). The electrowinning process typically involves plating the copper on copper starting sheets or stainless steel cathode mother blanks. The plating cycle usually takes about seven days to obtain a 100-pound cathode from each side of the mother blank. The cathodes are stripped mechanically from each side of the mother blank and are then available for further processing which can include drawing, rolling, etc. Often these cathodes are transported to a rod plant wherein they are subjected to continuous casting. After recovery of the desired copper, the copper-depleted electrolyte, which is sometimes referred to as "lean electrolyte," can be recycled as aqueous strip solution for fresh loading with copper values.

The production of copper powder by electrodeposition involves the use of an electrolytic cell containing an anode, a cathode, an electrolyte solution containing copper ions and sulfate ions, and a source of current. Through the application of voltage between the anode and the cathode the deposition of copper powder is effected on the cathode surface. The powder is then removed at timed intervals or in a continuous fashion. The process begins with the copper feed stock which is dissolved in sulfuric acid to form the electrolyte solution. Relatively pure electrolytes are required so that the copper powder is of sufficient purity for normal commercial purposes such as friction materials, bearings, alloying additives, powder metallurgy, etc. Copper removed from the electrolyte by the electrolytic production of copper powder is typically continuously replenished in order to maintain the concentration of the copper ions in solution. The purity of the electrolyte and the replacement of copper removed from the electrolyte is maintained by the use of relatively pure copper soluble anodes. The copper used for the anodes has been previously purified by electrolytic means to remove undesired contaminants. The electrolytically purified copper is typically recast into an anode shape suitable for powder production. An alternative method involves the use of electrolytically purified copper rods approximately ½-inch in diameter cut into +e,fra 1+ee -inch lengths and called copper shot which are then placed in an insoluble wire mesh anode basket.

The production of copper foil by electrodeposition also involves the use of an electroforming cell containing an anode, a cathode, an electrolyte solution containing copper ions and sulfate ions, and a source of current. Through the application of voltage between the anode and the cathode the deposition of copper is effected on the cathode surface. The copper feed stock, which is dissolved in sulfuric acid to form the electrolyte solution, is an electrolytically purified form of copper such as copper shot, copper wire, copper oxide or recycled copper. The resulting copper sulfate solution is then purified in order to ensure that high purity copper sulfate required for the production of foil is generated. Various types of agents for controlling the properties of the foil such as animal glue and thiourea can be added to the electrolyte solution. The electrolyte solution is pumped into the electroforming cell, and with the application of voltage between the anode and cathode, the electrodeposition of copper takes place. Typically the process involves using cylindrical cathodes that may be of varying diameters and widths. The anodes conform to the curvature of the cathodes so as to maintain a constant separation or gap between the two.

The electrolytically purified copper feedstocks used in prior art electrodeposition processes for making copper powder and copper foil are often produced using SX-EW techniques of the type discussed above. They are also made using traditional smelting and refining techniques. The prior art electrodeposition processes, which involve initially dissolving the copper feedstock in a digester to form copper ions, are slow, difficult to control, and require large quantities of expensive pure copper inventoried in the digester. It would be advantageous if copper powder could be produced directly from relatively impure sources of copper such as copper one or copper-containing waste without the additional steps of first recovering copper using electrolysis and then dissolving the pure copper metal to obtain copper ions for the electrolyte solution. It would also be advantageous if copper foil could be produced from a source of copper that was relatively pure and readily digestible in sulfuric acid. The present invention provides such advantages.

By virtue of the inventive process copper powder is produced in a simplified and less costly manner when compared to the prior art. The inventive process utilizes a copper source that does not require in its production the additional steps of electrowinning, drawing, etc., which are used in making the electrolytically purified copper feedstocks (e.g., copper shot, copper wire, copper oxide, recycled copper, etc.) used in the prior art. Impurities carried from the extraction steps used in the inventive process to the electrolyte solution used to make the copper powder do not degrade the performance characteristics of the copper powder. The copper powder made by the inventive process can be dissolved in sulfuric acid to form electrolyte solutions. These electrolyte solutions can be used to make copper foil and thus the foil-making process provided for herein is more easily controlled and more efficient than the prior art methods for making such foil. The copper powder can also be calcined to form cuprous oxide, cupric oxide or a mixture thereof. These copper oxides can be readily dissolved in sulfuric acid and used to make copper foil.

The article by I. D. Enchev et al, "Production of Copper Powder by the Method of Electrolytic Extraction Using a Reversing Current", Poroshkovaya Metallurgiya, No. 9 (141), September, 1974, pp. 95–98, discloses the results of an investigation into the production of copper from electrolytes prepared from lean ore solutions by ion exchange or reversing electrolytic extraction. Electrolyte solutions prepared by leaching ore wastes and subsequent extraction with ABF dissolved in kerosene were used. The article indicates that the disclosed process yields a high-purity powder (99.98% copper) at an oxygen content of 0.2–0.4%.

SUMMARY OF THE INVENTION

This invention is directed to a process for making copper metal powder from copper-bearing material, comprising: (A) contacting said copper-bearing material with an effective amount of at least one aqueous leaching solution to dissolve copper ions in said leaching solution and form a copper-rich aqueous leaching solution; (B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution, said extractant comprising (i) at least one oxime characterized by a hydrocarbon linkage with at least one —OH group and at least one =NOH group attached to different carbon atoms on said hydrocarbon linkage, (ii) at least one betadiketone, or (iii) at least one ion-exchange resin; (C) separating said copper-rich extractant from said copper-depleted aqueous leaching solution; (D) contacting said copper-rich extractant with an effective amount of at least one aqueous stripping solution to transfer copper ions from said extractant to said stripping solution to form a copper-rich stripping solution and a copper-depleted extractant; (E) separating said copper-rich stripping solution from said copper-depleted extractant to form a first electrolyte solution; (F) advancing said first electrolyte solution to an electrolytic cell equipped with at least one first anode and at least one first cathode, and applying an effective amount of voltage across said first anode and said first cathode to deposit copper metal powder on said first cathode; and (G) removing copper metal powder from said first cathode. In one embodiment the copper metal powder is converted to copper foil. In one embodiment the copper metal powder is converted to cuprous oxide, cupric oxide or a mixture thereof; these copper oxides can be readily dissolved in sulfuric acid and used to make copper foil.

BRIEF DESCRIPTION OF THE DRAWINGS

In the annexed drawings like parts and features are designated by the like reference numerals.

DESCRIPTION OF THE PREFERRED EMBODIMENTS

Figure 1:
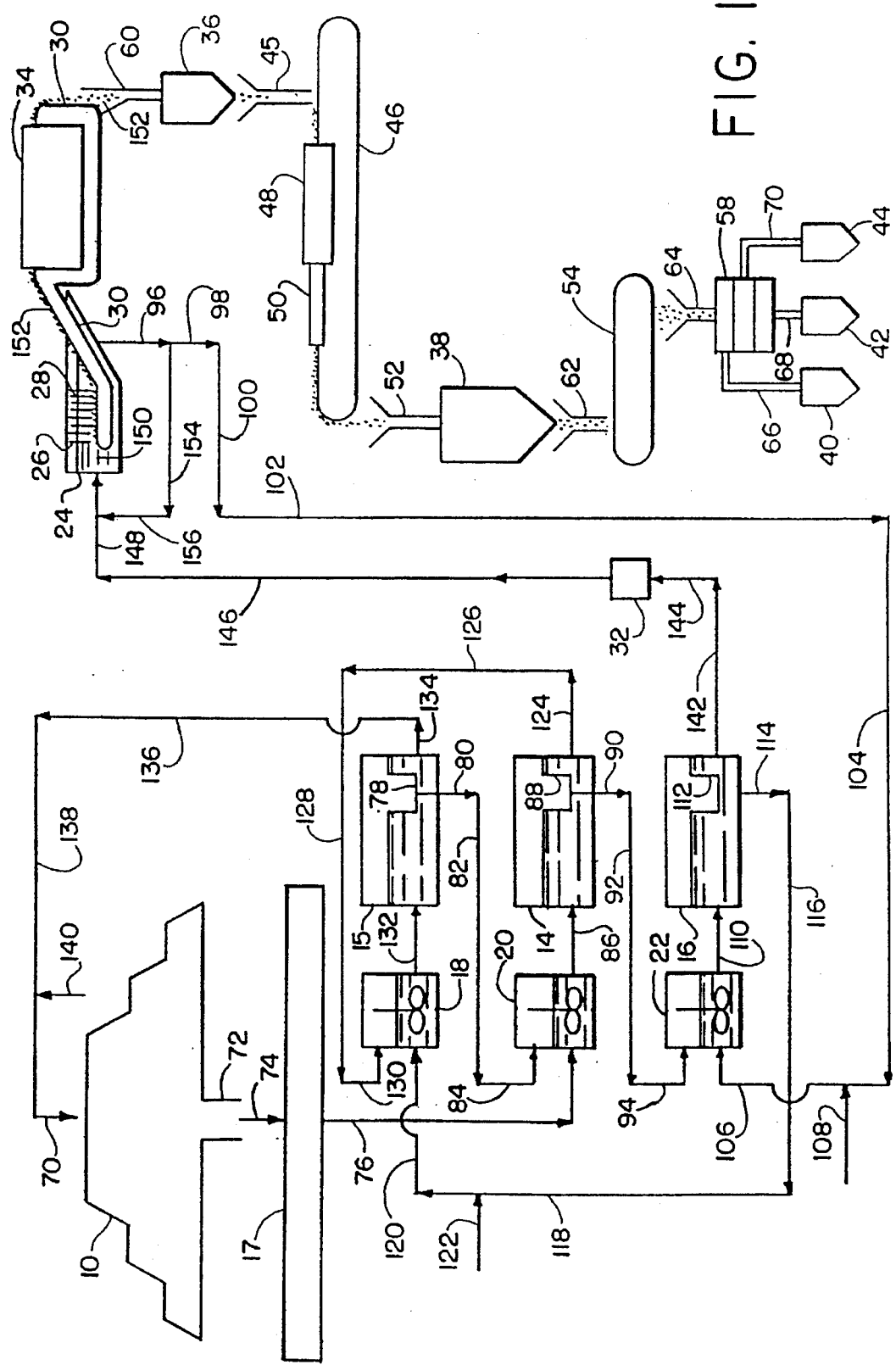
FIG. 1 is a flow sheet illustrating one embodiment of the process of the invention.

The copper-bearing material can be any source of copper from which copper can be extracted. These sources include copper ore, smelter flue dust, copper cement, copper sulfate, and copper-containing waste. The term "copper-containing waste" refers to any solid or liquid waste material (e.g., garbage, sludge, effluent streams, etc.) that contains copper. These waste materials include hazardous wastes. Specific examples of wastes that can be used are copper oxides obtained from treating spent cupric chloride etchants. Also, copper sources used in the prior art such as copper shot, copper wire, recycled copper, etc., can be used, but the economic advantages of using the inventive process are reduced when such prior art sources are used.

In one embodiment copper ore from an open pit mine is used as the copper-bearing material. The ore is hauled to a heap-leaching dump which is typically built on an area underlain with a liner, such as a thick high-density polyethylene liner, to prevent loss of leaching fluids into the surrounding water shed. A typical heap-leaching dump has a surface area of, for example, about 125,000 square feet and contains approximately 110,000 tons of ore. As leaching progresses and new dumps are built on top of the old dumps, they become increasingly higher and eventually reach heights of, for example, about 250 feet or more. A network of pipes and wobbler sprinklers is laid on the surface of a newly completed dump and a weak solution of sulfuric acid is continuously sprayed at a rate of, for example, about 0.8 gallon per minute per 100 square feet of surface area. The leaching solution percolates down through the dump, dissolves copper in the ore, flows from the dump base as a copper-rich aqueous leach solution, drains into a collection pond, and is pumped to a feed pond for subsequent treatment using the inventive process.

With some mining operations in-situ leaching is used to extract copper values from copper ore. The copper-rich leach solution obtained by this process can be used in the inventive process as the copper-bearing material. In-situ leaching is useful when reserves of acid-soluble oxide ore lie beneath an open pit area and above the depleted portion of an underground mine. Injection wells are drilled into this zone at a depth of, for example, about 1000 feet. The wells are cased with polyvinylchloride pipe, the bottom portion of which is slotted to allow solution into the ore. A leach solution of weak sulfuric acid is injected into each well at a rate dependent upon the permeability of the zone into which it is drilled. The solution percolates down through the ore zone, dissolves the copper minerals, and drains into a prepared collection area. The collection area can be, for example, haulage drifts of the underground mine. The copper-bearing aqueous leach solution that is produced is pumped to the surface by means of a corrosion-resistant pumping system where it is available for use as the copper-bearing material for the inventive process.

In mining operations wherein both leach dumps and in-situ leaching are employed, the copper-bearing leach solution (sometimes referred to as a pregnant leach solution) from each can be combined and used as the copper-bearing material in the inventive process.

The aqueous leaching solution used in step (A) of the inventive process is preferably a sulfuric acid solution or an ammonia solution. The sulfuric acid solution preferably has a sulfuric acid concentration in the range of about 5 to about 50 grams per liter, more preferably about 5 to about 40 grams per liter, more preferably about 10 to about 30 grams per liter.

The ammonia solution preferably has an ammonia concentration in the range of about 20 to about 140 grams per liter, more preferably about 30 to about 90 grams per liter. The pH of this solution is preferably in the range of about 7 to about 11, more preferably about 8 to about 9.

The copper-rich aqueous leaching solution or pregnant leaching solution formed during step (A) preferably has a copper ion concentration in the range of about 0.8 to about 5 grams per liter, more preferably about 1 to about 3 grams per liter. When the leaching solution used in step (A) is a sulfuric acid solution, the concentration of free sulfuric acid in the copper-rich aqueous leaching solution is preferably from about 5 to about 30 grams per liter, more preferably about 10 to about 20 grams per liter. When the leaching solution used in strip (A) is an ammonia solution, the concentration of free ammonia in the copper-rich aqueous leaching solution is preferably from about 10 to about 130 grams per liter, more preferably about 30 to about 90 grams per liter.

The water-insoluble extractant used in step (B) of the inventive process can be any water-insoluble extractant capable of extracting copper ions from an aqueous medium. In one embodiment the extractant is dissolved in a water-immiscible organic solvent. (The terms "water-immiscible" and "water-insoluble" refer to compositions that are not soluble in water above a level of about 1 gram per liter at 25° C.) The solvent can be any water-immiscible solvent for the extractant with kerosene, benzene, toluene, xylene, naphthalene, fuel oil, diesel fuel and the like being useful, and with kerosene being preferred. Examples of useful kerosenes are SX-7 and SX-12 which are available from Phillips Petroleum.

In one embodiment the extractant is an organic compound containing at least two functional groups attached to different carbon atoms of a hydrocarbon linkage, one of the functional groups being —OH and the other of said functional groups being =NOH. These compounds can be referred to as oximes.

In one embodiment the extractant is an oxime represented by the formula $$R^1-\underset{\underset{R^7}{|}}{\overset{\overset{OH}{|}}{C}}-\underset{\underset{R^6}{|}}{\overset{\overset{R^2}{|}}{C}}-\overset{\overset{NOH}{\|}}{C}-\underset{\underset{R^5}{|}}{\overset{\overset{R^3}{|}}{C}}-R^4$$

wherein $R^1$, $R^2$, $R^3$, $R^4$, $R^5$, $R^6$ and $R^7$ are independently hydrogen or hydrocarbyl groups. In a preferred embodiment, $R^1$ and $R^4$ are each butyl; $R^2$, $R^3$ and $R^6$ are each hydrogen; and $R^5$ and $R^7$ are each ethyl. Compounds with the structure of this preferred embodiment are available from Henkel Corporation under the trade designation LIX 63.

In one embodiment the extractant is an oxime represented by the formula

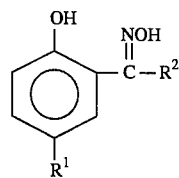

wherein $R^1$ and $R^2$ are independently hydrogen or hydrocarbyl groups. Useful embodiments include those wherein $R^1$ is an alkyl group of about 6 to about 20 carbon atoms, preferably about 9 to about 12 carbon atoms; and $R^2$ is hydrogen, an alkyl group of 1 to about 4 carbon atoms, preferably 1 or 2 carbon atoms, or $R^2$ is phenyl. The phenyl group can be substituted or unsubstituted with the latter being preferred. The following compounds, which are based upon the above-indicated formula, are available from Henkel Corporation under the indicated trade designations and are useful with the inventive process:

| Trade Designation | $R^1$ | $R^2$ |
|---|---|---|
| LIX 65 | Nonyl | Phenyl |
| LIX 84 | Nonyl | Methyl |
| LIX 860 | Dodecyl | Hydrogen |

Other commercially available materials available from Henkel Corporation that are useful include: LIX 64N (identified as a mixture of LIX 65 and LIX 63); and LIX 864 and LIX 984 (identified as mixtures of LIX 860 and LIX 84).

In one embodiment the extractant is a betadiketone. These compounds can be represented by the formula

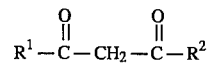

wherein $R^1$ and $R^2$ are independently alkyl groups or aryl groups. The alkyl groups preferably contain 1 to about 10 carbon atoms. The aryl groups are preferably phenyl. An example of a commercial extractant available from Henkel Corporation corresponding to the above formula is LIX 54. These betadiketones are particularly useful when the leaching solution used in step (A) of the inventive process is an ammonia solution.

The concentration of the extractant in the organic solution is preferably in the range of about 2% to about 40% by weight. In one embodiment the organic solution contains from about 5% to about 10%, preferably about 6 to about 8%, more preferably about 7% by weight of LIX 984, with the remainder being SX-7.

In one embodiment the extractant is an ion-exchange resin. These resins are typically small granular or bead-like materials consisting of two principal parts: a resinous matrix serving as a structural portion, and an ion-active group serving as the functional portion. The functional group is preferably selected from those functional groups that are reactive with copper ions. Examples of such functional groups include $—SO_3^-$, $—COO^-$,

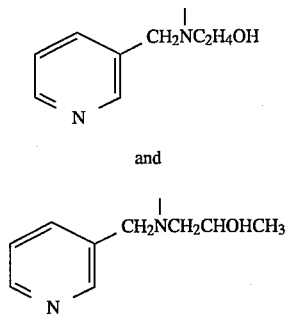

Preferred resin matrixes include the copolymers of styrene and divinylbenzene. Examples of commercially available resins that can be used include IRC-718 (a product of Rohm & Haas identified as a tertiary amine substituted copolymer of styrene and divinylbenzene), IR-200 (a product of Rohm & Haas identified as sulfonated copolymer of styrene and divinylbenzene), IR-120 (a product of Rohm & Haas identified as sulfonated copolymer of styrene and divinyl benzene), XFS 4196 (a product of Dow identified as a macroporous polystyrene/divinylbenzene copolymer to which has been attached N-(2-hydroxyethyl)-picolylamine), and XFS 43084 (a product of Dow identified as a macroporous polystyrene/divinylbenzene copolymer to which has been attached N-(2-hydroxypropyl)-picolylamine). These resins are preferably used in the inventive process as fixed beds or moving beds. During step (B) of the inventive process, the resin is contacted with the copper-rich aqueous leach solution from step (A), the contacting being sufficient to transfer copper ions from the leach solution to the resin. The copper-rich resin is then stripped during step (D) to provide a copper-stripped or copper-depleted resin which can be used during step (B).

The copper-rich extractant that is separated during step (C) of the inventive process preferably has a concentration of copper in the range of about 1 to about 6 grams per liter of extractant, more preferably about 2 to about 4 grams per liter of extractant. The copper-depleted aqueous leaching solution that is separated during step (C) preferably has a copper ion concentration in the range of about 0.01 to about 0.8 grams per liter, more preferably about 0.04 to about 0.2 grams per liter. When the leaching solution used in step (A) is a sulfuric acid solution, the concentration of free sulfuric acid in the copper-depleted aqueous leaching solution separated during step (C) is preferably from about 5 to about 50 grams per liter, more preferably about 5 to about 40 grams per liter, more preferably about 10 to about 30 grams per liter. When the leaching solution used in step (A) is an ammonia solution, the concentration of free ammonia in the copper-depleted aqueous leaching solution separated during step (C) is preferably from about 10 to about 130 grams per liter, more preferably about 30 to about 90 grams per liter.

In one embodiment the contacting and separating steps (B) and (C) of the inventive process are conducted in two stages. In this embodiment, steps (B-1) and (B-2) are contacting steps and (C-1) and (C-2) are separating steps. Thus, in this embodiment, the inventive process involves the following sequential steps (A), (B-1), (C-1), (B-2), (C-2), (D), (E), (F) and (G), with process streams from several of these steps being recirculated to other steps in the process. Step (B-1) involves contacting the copper-rich aqueous leaching solution formed during step (A) with an effective amount of at least one copper-bearing water-insoluble extractant from step (C-2) to transfer copper ions from said copper-rich aqueous leaching solution to said copper-bearing extractant to form a copper-rich extractant and a first copper-depleted aqueous leaching solution. Step (C-1) involves separating the copper-rich extractant formed during step (B-1) from the first copper-depleted aqueous leaching solution formed during step (B-1). The copper-rich extractant that is separated during step (C-1) preferably has a concentration of copper in the range of about 1 to about 6 grams per liter of extractant, more preferably about 2 to about 4 grams per liter of extractant. The first copper-depleted aqueous leaching solution that is separated during step (C-1) preferably has a copper ion concentration in the range of about 0.4 to about 4 grams per liter, more preferably about 0.5 to about 2.4 grams per liter. When the leaching solution used in step (A) is a sulfuric acid solution, the concentration of free sulfuric acid in the first copper-depleted aqueous leaching solution separated during step (C-1) is preferably from about 5 to about 50 grams per liter, more preferably about 5 to about 30 grams per liter, more preferably about 10 to about 30 grams per liter. When the leaching solution used in step (A) is an ammonia solution, the concentration of free ammonia in the first copper-depleted aqueous leaching solution separated during step (C-1) is preferably from about 10 to about 130 grams per liter, more preferably about 30 to about 90 grams per liter.

Step (B-2) involves contacting the first copper-depleted aqueous leaching solution separated during step (C-1) with an effective amount of at least one copper-depleted extractant from step (E) to transfer copper ions from said first copper-depleted aqueous leaching solution to said copper-depleted extractant to form a copper-bearing extractant and a second copper-depleted aqueous leaching solution. Step (C-2) involves separating the copper-bearing extractant formed during step (B-2) from the second copper-depleted aqueous leaching solution formed during step (B-2). The copper-bearing extractant that is separated during step (C-2) preferably has a concentration of copper in the range of about 0.4 to about 4 grams per liter of extractant, more preferably about 1 to about 2.4 grams per liter of extractant. The second copper-depleted aqueous leaching solution that is separated during step (C-2) preferably has a copper ion concentration in the range of about 0.01 to about 0.8 grams per liter, more preferably about 0.04 to about 0.2 grams per liter. When the leaching solution used in step (A) is a sulfuric acid solution, the concentration of free sulfuric acid in the second copper-depleted aqueous leaching solution separated during step (C-2) is preferably from about 5 to about 50 grams per liter, more preferably about 5 to about 40 grams per liter, more preferably about 10 to about 30 grams per liter. When the leaching solution used in step (A) is an ammonia solution, the concentration of free ammonia in the second copper-depleted aqueous leaching solution separated during step (C-2) is preferably from about 10 to about 130 grams per liter, more preferably about 30 to about 90 grams per liter.

The stripping solution used in step (D) of the inventive process is preferably a sulfuric acid solution which has a free sulfuric acid concentration in the range of about 80 to about 300 grams per liter, more preferably about 150 to about 250 grams per liter. The copper-rich stripping solution that is formed during step (D) preferably has a copper ion concentration in the range of about 2 to about 60, more preferably about 5 to about 15 grams per liter; and a free sulfuric acid concentration in the range of about 70 to about 290, more preferably about 140 to about 240 grams per liter.

The electrodeposition steps (F) and (G) of the inventive process involve advancing the copper-rich stripping solution from step (E) into an electrolytic cell and electrodepositing copper metal powder on the cathode of such cell. The copper-rich stripping solution treated in the electrolytic cell can be referred to as either a copper-rich stripping solution or an electrolyte solution. In one embodiment this electrolyte solution is subjected to a purification or filtering process prior to entering the electrolytic cell. The electric current used in the cell is preferably direct current or alternating current with a direct current bias. The electrodeposited copper metal powder is removed from the cathode using conventional techniques.

The flow of the electrolyte solution through the electrolytic cell is sufficient to maintain constant a desired difference in copper ion concentration between electrolyte solution entering the cell and the electrolyte solution leaving the cell. Preferably this difference in copper ion concentration is from about 1 to about 10 grams per liter, more preferably about 1 to about 3 grams per liter, with the solution entering the electrolytic cell having a higher concentration of copper ions than the solution leaving the cell. Advantageously, the flow between the anode and the cathode is effected by natural convection. The electrolyte solution preferably has a free sulfuric acid concentration in the range of about 70 to about 300 grams per liter, more preferably about 140 to about 250 grams per liter. The temperature of the of the electrolyte solution in the electrolytic cell is preferably in the range of about 20° C. to about 65° C., more preferably about 30° C. to about 45° C. The copper ion concentration (contained in $CuSO_4$) is preferably in the range of about 1 to about 60 grams per liter, more preferably from about 4 to about 15 grams per liter. The free chloride ion concentration is preferably up to about 100 ppm, more preferably up to about 50 ppm. In one embodiment the free chloride ion concentration is up to about 20 ppm, preferably up to about 15 ppm. The impurity level is preferably at a level no more than about 20 grams per liter, and preferably is in the range of about 0.5 to about 10 grams per liter. The current density is preferably in the range of about 20 to about 300 amps per square foot, more preferably about 30 to about 200 amps per square foot.

During electrodeposition one or more addition agents can be added to the electrolyte solution to alter the copper metal powder characteristics. These include gelatins derived from collagen, an example of which is animal glue. Other additives can be added to the electrolyte to control particle size of the powder. Examples of such other additives include benzotriazole and thiourea. Chloride ions can be added to increase the dendritic character of the powder particles and to increase the yield of fine powder. Sodium sulfate can be added to reduce cathode current density. Increased amounts of sodium sulfate tend to reduce particle size of the powder. Sulfonates can be added to the electrolyte to provide for a more coarse particle size. Examples of such sulfonates include Orzan-A (a product of Tembind identified as ammonium lignosulfonate). These addition agents are typically added to the electrolyte solutions at concentration levels of up to about 20 grams per liter, more preferably up to about 10 grams per liter.

During the electrodeposition step (F) it is preferred to maintain the ratio of applied current density (I) to diffusion limited current density ($I_L$) at a level of about 0.8 or greater, more preferably about 0.9 or greater. That is, $I/I_L$ is preferably about 0.8 or greater, more preferably about 0.9 or greater. The applied current density (I) is the number of amperes applied per unit area of electrode surface. The diffusion limited current density ($I_L$) is the maximum rate at which copper can be deposited. The maximum deposition rate is limited by how fast copper ions can diffuse to the surface of the cathode to replace those depleted by previous deposition. It can be calculated by the equation $$I_L = \frac{nFDC°}{\delta(1-t)}$$

The terms used in the foregoing equation and their units are defined below:

| Symbol | Description | Units |
| --- | --- | --- |
| I | Current Density | Amperes/cm² |
| $I_L$ | Diffusion Limited Current Density | Amperes/cm² |
| n | Equivalent Charge | Equivalents/mole |
| F | Faraday's Constant | 96487 (Amp)(second)/equivalent |
| C° | Bulk Cupric Ion Concentration | Mole/cm³ |
| D | Diffusion Coefficient | cm²/second |
| δ | Concentration Boundary Layer Thickness | cm |
| t | Copper transfer number | Dimensionless |

The boundary layer thickness δ is a function of viscosity, diffusion coefficient, and flow velocity between the anode and the cathode. The flow velocity is effected by the overall flow rate of electrolyte solution into and out of the electrolytic cell and by any agitation that is effected within the cell. In one embodiment the following parameter values are useful in electrodepositing copper powder:

| Parameter | Value |
| --- | --- |
| I (A/cm²) | 0.060 |
| n (eq/mole) | 2 |
| D (cm²/s) | $1.6 \times 10^{-5}$ |
| C° (mole/cm³, $Cu^{+2}$ (as $CuSO_4$) | $1.57 \times 10^{-4}$ |
| Temperature (°C.) | 38 |
| Free sulfuric acid (g/l) | 175 |
| Kinematic viscosity (cm²/s) | 0.0126 |
| Flow velocity (cm/s) | Natural convection |

The copper metal powder can be removed from the cathode by brushing, scraping, vibration or other mechanical and/or electrical techniques known in the art. Powder can be removed by reversing the current on the cathode. Particle size can be controlled by controlling the length of the interval between powder removal with powder becoming coarser as the interval is increased. Also, the apparent density increases as the length of the interval is extended.

In one embodiment a series of disc-shaped rotating cathodes are used which are partially submerged in the electrolyte solution. Cathodes of this type are disclosed, for example, in U.S. Pat. No. 3,616,277, which is incorporated herein by reference. Copper powder is deposited on the disc-shaped cathodes as they rotate through the electrolyte solution. The cathodes, which can be made, for example, of titanium and insoluble anodes (e..g., platinized titanium) are positioned in the electroforming cell in interleaved arrangement with the cathodes. Powder is continuously deposited on the cathodes and continuously removed by doctor blades, which can be made of plastic or stainless steel and are mounted adjacent the cathodes above the electrolyte level of the cell.

In one embodiment the copper metal powder that is removed during step (G) of the inventive process is washed sufficiently to remove electrolyte which can cause the powder to oxidize. Various methods can be employed to wash the powder. One method involves centrifuging the powder to remove the electrolyte, washing the powder and then dewatering the powder.

In another method, the copper metal powder is transferred into a large tank and water is added to produce a slurry that is pumped into a filter. In the filter, the powder is dewatered, washed several times, and again dewatered. During this process stabilizers can be added to reduce oxidation. Examples of such stabilizers include aqueous solutions of gelatin. The addition of antioxidants during washing or subsequent powder treatment also protects the powder from oxidation. Examples of these antioxidants include benzotriazole.

After washing and dewatering, the wet powder can be subjected to heat treating which tends to alter certain properties of the copper metal powder, particularly particle size and shape, apparent density, and green strength. In one embodiment, the powder is heat treated on a mesh belt electric furnace. To prevent the powder from failing through the belt, a continuous sheet of high wet-strength paper is fed to the belt, and then the powder is transferred to the paper. A roller compresses the powder to improve heat transfer. As it enters the furnace, water is driven off and the paper burns-but not before the powder has sintered sufficiently to prevent it from falling through the belt. The furnace atmosphere is produced in exothermic gas units in which natural gas and air are blended to yield an atmosphere containing, for example, about 17% hydrogen, about 12% CO, about 4% $CO_2$, with the balance being nitrogen. The gas is advanced through a cooler to the furnace. In the cooler, the gas is preferably cooled to lower the dew point to the range of about $-22°$ C. to about $-40°$ C. The gas enters the furnace from the discharge end and, because it is cooled, aids in cooling the powder cake. The furnace operation dries the powder, alters the particle shape, reduces the oxides, and sinters the fines. The discharge temperature is sufficiently low to prevent reoxidation of the powder cake. By varying the furnace temperature between preferably about 250° C. to about 900° C., more preferably about 370° C. and about 650° C. and altering the time of exposure, change can be made in the content of fines, apparent density, and dimensional characteristics. Upon completion of the heat treating operation, the resulting powder cake is broken and is ready for milling.

Milling can be performed, for example, in a high-speed, water-cooled hammer mill in which feed rate, mill speed, and screen openings under the mill can be varied to obtain the powder characteristics desired. The powder leaving the mill is fed to screens where it is separated into particle size fractions. The $-100$ mesh powder can be classified in an air classifier and the fines can be blended in with the final powder product. Oversize material can be returned to the mill for additional milling. Alternatively, either or both undersized and oversized particles can be combined with the first electrolyte solution separated during step (E). The copper metal powders produced during the milling and classifying operations can be stored in drums to which a drying agent such as silica gel or camphor can be added to prevent or reduce oxidation.

The properties of copper metal powder produced by the inventive process are dependent on various characteristics of the operation and, therefore, can often be controlled by altering certain process variables. Purity of powder prepared by the inventive process can be high, with copper contents that can exceed, for example, about 99.5% by weight. A measure of the oxygen content can be obtained by exposing a sample of powder to hydrogen at an elevated temperature as specified in American Society for Testing and Materials standard ASTM E 159 or Metal Powder Industries Federation standard MP1F 02. Generally, the hydrogen loss can range, for example, from about 0.1 to about 0.5%, depending on the apparent density and particle size distribution of the powder. Nitric acid insolubles are also determined by ASTM or MP1F standard procedures and can be less than, for example, about 0.05% by weight.

Particle size distribution for the copper powder can be selected to meet the requirements of the application and can be varied over a wide range. For example, the $-325$ mesh fraction can be varied from about 5% to about 90% by weight.

Apparent densities of the powder can be in the range of, for example, about 1 to about 4 $g/cm^3$. Densities that are somewhat lower and higher can be produced, depending on process conditions. Generally powders with apparent densities of less than about 1.3 $g/cm^3$ do not flow, powders with apparent densities of about 1.3 to about 2.3 $g/cm^3$ have poor flow rams, and powders with high apparent densities flow freely. At about 2.2 $g/cm^3$, which is the transition range flow depends on the content of fine particles of the powder, because relatively fine powders have poor flowability and relatively coarse powders flow freely. Typical flow rates range from about 10 to about 50 seconds for a 50-gram sample.

Green density is a function of the compacting pressure. For example, the green density can rise from 7 to about 8 $g/cm^3$ as the compacting pressure is increased from about 20 to about 40 tons per square inch (tsi). Green strength increases with the compacting pressure. For example, the green strength can rise from less than about 2200 psi up to about 3500 psi as the compacting pressure is increased from about 20 to about 40 tsi. Particle shape of the copper metal powder is generally dendritic when deposited on the cathode. During subsequent operations, however, the dendrites tend to become rounded.

Electrical conductivity that is high can be achieved when a high-purity copper metal powder produced by the inventive process is used. High conductivity can be achieved with high-density compacts. Electrical conductivity can be increased by coining and resintering.

In one embodiment the copper metal powder removed during step (G) of the inventive process is calcined to form cuprous oxide, cupric oxide or a mixture thereof. Cupric oxide is preferably made by calcining the copper metal powder at a temperature in the range of about 400° C. to about 850° C., preferably about 450° C. to about 500° C., at an oxygen stoichiometric excess of at least about 15%, preferably in the range of about 15% to about 25%, for at least one minute, preferably at least three minutes. Cuprous oxide is preferably made by calcining the copper metal powder at a temperature in the range of either about 200° C. to about 300° C., or about 1025° C. to about 1065° C., at an oxygen stoichiometric excess of less than about 15%, for at least one minute, preferably at least three minutes.

In one embodiment the copper metal powder removed during step (G) of the inventive process or the calcined copper metal powder (i.e., cuprous oxide, cupric oxide or mixtures thereof) is dissolved in sulfuric acid to form a second electrolyte solution and this second electrolyte solution is subjected to electrodeposition to make copper foil. This second electrolyte solution preferably has a free sulfuric acid concentration in the range of about 70 to about 170 grams per liter, more preferably about 80 to about 120 grams per liter. The copper ion concentration (contained in $CuSO_4$)

is preferably in the range of about 40 to about 150 grams per liter, more preferably from about 90 to about 110 grams per liter. The free chloride ion concentration is preferably up to about 300 ppm, more preferably up to about 150 ppm, more preferably up to about 100 ppm. In one embodiment the free chloride ion concentration is from about 40 to about 100 ppm, or about 50 to about 100 ppm. The impurity level is preferably at a level of no more than about 20 grams per liter, and typically is in the range of about 0.5 to about 10 grams per liter.

In one embodiment copper metal powder is dissolved in the sulfuric acid to form the second electrolyte solution by adding the powder to a digester in either a batch or continuous fashion. The powder mixes with sulfuric acid in the digester. To improve the efficiency of the digester and the control of the copper ion concentration the copper powder is maintained in suspension as a slurry in the digester. This can be accomplished by mechanical agitation or the use of an air lift column. With the air lift column air is forced into the bottom of the digester. The air rises upward through a cylindrical draft tube which is smaller in diameter than the digester and whose axis is concentric with the axis of the digester. Air bubbles rising through the draft tube causes a mixing action in the digester that keeps the copper powder suspended in a well mixed slurry and promotes more rapid dissolution of the copper powder. The dissolution of the copper powder is accomplished by the addition of oxygen or oxygen in the form of air which is forced into the bottom of the digester. Oxygen dissolved in the electrolyte or contained in bubbles rising through the electrolyte contacts the surface of the copper and in a reaction with the acid in the electrolyte dissolves the copper. The electrolyte circulates in a loop through the digester vessel to a liquid/solid separator. The separator removes undissolved copper powder which is then returned to the digester.

In one embodiment calcined copper metal powder (i.e., cuprous oxide, cupric oxide or mixture thereof) is dissolved in the sulfuric acid to form the second electrolyte solution by adding the powder to a digester in either a batch or continuous fashion. The calcined powder readily dissolves in the sulfuric acid. The electrolyte circulates in a loop through the digester vessel to a liquid/solid separator. The separator removes undissolved calcined powder which can then be returned to the digester.

The second electrolyte solution is advanced to an electroforming cell equipped with an anode and a rotating cathode. This electrolyte solution can be subjected to a purification or filtering process prior to entering the electroforming cell to ensure that the electrodeposited foil contains no disruptions and/or discontinuities. When voltage is applied between the anode and cathode, electrodeposition of copper foil occurs at the cathode. The electric current is preferably direct current or alternating current with a direct current bias. The electrodeposited foil is removed from the cathode as a continuous thin web as the cathode rotates. It can be collected in roll form. The rotating cathode preferably is in the form of a cylindrical mandrel. However, alternatively, the cathode can be in the form of a moving belt. Both of these designs are known in the art. The anode has a curved shape conforming to the curved shape of the cathode to provide a uniform gap between the anode and the cathode. This gap preferably has a width of about 0.3 to about 2 centimeters.

The velocity of the flow of the electrolyte solution through the gap between the anode and the cathode in the electroforming cell is preferably in the range of about 0.2 to about 5 meters per second, more preferably about 1 to about 3 meters per second. The temperature of the of the electrolyte solution in the electroforming cell is preferably in the range of about 25° C. to about 100° C., more preferably about 40° C. to about 70° C. The current density is preferably in the range of about 100 to about 3000 amps per square foot, more preferably about 400 to about 1800 amps per square foot.

During the electrodeposition of foil the second electrolyte solution can optionally contain one or more active sulfur-containing materials. The term "active-sulfur containing material" refers to materials characterized generally as containing a bivalent sulfur atom both bonds of which are directly connected to a carbon atom together with one or more nitrogen atoms also directly connected to the carbon atom. In this group of compounds the double bond may in some cases exist or alternate between the sulfur or nitrogen atom and the carbon atom. Thiourea is a useful active sulfur-containing material. The thioureas having the nucleus

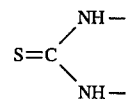

and the iso-thiocyanates having the grouping S=C=N— are useful. Thiosinamine (allyl thiourea) and thiosemicarbazide are also useful. The active sulfur-containing material should be soluble in the second electrolyte solution and be compatible with the other constituents. The concentration of active sulfur-containing material in the electrolyte solution during electrodeposition is preferably up to about 20 ppm, more preferably in the range of about 0.1 to about 15 ppm.

The second electrolyte solution used in the production of foil can also optionally contain one or more gelatins. The gelatins that are useful herein are heterogeneous mixtures of water-soluble proteins derived from collagen. Animal glue is a preferred gelatin because it is relatively inexpensive, commercially available and convenient to handle. The concentration of gelatin in the electrolyte solution is preferably up to about 20 ppm, more preferably up to about 10 ppm, and preferably in the range of about 0.2 to about 10 ppm.

The second electrolyte solution used in the production of foil can also optionally contain other additives known in the art for controlling the properties of the electrodeposited foil. Examples include molasses, guar gum, the polyalkylene glycols (e.g., polyethylene glycol, polypropylene glycol, polyisopropylene glycol, etc.), dithiothreitol, amino acids (e.g., proline, hydroxyproline, cysteine, etc.), acrylamide, sulfopropyl disulfide, tetraethylthiuram disulfide, benzyl chloride, epichlorohydrin, chlorohydroxylpropyl sulfonate, alkylene oxides (e.g., ethylene oxide, propylene oxide, etc.), the sulfonium alkane sulfonates, thiocarbamoyldisulfide, selenic acid, or a mixture of two or more thereof. These additives are preferably used in concentrations of up to about 20 ppm, more preferably about 1 to about 10 ppm.

During the electrodeposition of copper foil it is preferred to maintain the ratio of applied current density (I) to diffusion limited current density ($I_L$) at a level of about 0.4 or less, more preferably about 0.3 or less. That is, $I/I_L$ is preferably about 0.4 or less, more preferably about 0.3 or less. In one embodiment the following parameter values are useful in electrodepositing foil:

| Parameter | Value |
| --- | --- |
| I (A/cm$^2$) | 1.0 |
| n (eq/mole) | 2 |
| D (cm$^2$/s) | $3.5 \times 10^{-5}$ |
| C° (mole/cm$^3$, Cu$^{+2}$ (as CuSO$_4$)) | $1.49 \times 10^{-3}$ |
| Temperature (°C.) | 60 |
| Free sulfuric acid (g/l) | 90 |
| Kinematic Viscosity (cm$^2$/s) | 0.0159 |
| Flow rate (cm/s) | 200 |

The term "untreated" is used herein to refer to raw or base foil that has not undergone subsequent treatment for the purpose of refining or enhancing the foil properties. The term "treated" is used herein to refer to raw or base foil that has undergone such treatment. This treatment is entirely conventional and typically involves the use of various treating and rinsing solutions. For example, in one embodiment at least one side of the foil is treated with at least one roughened layer of copper or copper oxide. In another embodiment at least one side of the foil is treated with at least one metallic layer, the metal in said metallic layer being selected from the group consisting of indium, zinc, tin, nickel, cobalt, copper-zinc alloy and copper-tin alloy. In another embodiment at least one side of the foil is treated with at least one metallic layer, the metal in said metallic layer being selected from the group consisting of tin, chromium, and chromium-zinc alloy. In another embodiment at least one side of the foil is treated with at least one toughened layer of copper or copper oxide, then at least one metallic layer is applied to the toughened layer, the metal in the metallic layer being selected from the group consisting of indium, zinc, tin, nickel, cobalt, copper-zinc alloy and copper-tin alloy. In another embodiment at least one side of the foil is treated with at least one roughened layer of copper or copper oxide, then at least one metallic layer is applied to the roughened layer, the metal in said metallic layer being selected from the group consisting of tin, chromium, and chromium-zinc alloy. In another embodiment at least one side of the foil is treated with at least one roughened layer of copper or copper oxide, then at least one first metallic layer is applied to the toughened layer, the metal in said first metallic layer being selected from the group consisting of indium, zinc, tin, nickel, cobalt, copper-zinc alloy and copper-tin alloy, then at least one second metallic layer is applied to the first metallic layer, the metal in the second metallic layer being selected from the group consisting of tin, chromium, and chromium-zinc alloy. These treating techniques are well-known in the art.

The copper foils produced by the inventive process have a smooth or shiny (drum) side and a rough or matte (copper deposit growth front) side. These foils can be bonded to dielectric substrates to provide dimensional and structural stability thereto, and in this regard, it is preferred to bond the matte side of the electrodeposited foil to the substrate so that the shiny side of the foil faces outwardly from the laminate. Useful dielectric substrates may be prepared by impregnating woven glass reinforcement materials with partially cured resins, usually epoxy resins. These dielectric substrates are sometimes referred to as prepregs.

In preparing the laminates, it is useful for both the prepreg material and the electrodeposited copper foil to be provided in the form of long webs of material rolled up in rolls. The rolled materials are drawn off the rolls and cut into rectangular sheets. The rectangular sheets are then laid-up or assembled in stacks of assemblages. Each assemblage may comprise a prepreg sheet with a sheet of foil on either side thereof, and in each instance, the matte side of the copper foil sheet is positioned adjacent the prepreg so that the shiny sides of the sheets of foil face outwardly on each side of the assemblage.

The assemblage may be subjected to conventional laminating temperatures and pressures between the plates of laminating presses to prepare laminates comprising sandwiches of a sheet of prepreg between sheets of copper foil. The prepregs may consist of a woven glass reinforcement fabric impregnated with a partially cured two-stage resin. By application of heat and pressure, the matte side of the copper foil is pressed tightly against the prepreg and the temperature to which the assemblage is subjected activates the resin to cause curing, that is crosslinking of the resin and thus tight bonding of the foil to the prepreg dielectric substrate. Generally speaking, the laminating operation will involve pressures in the range of from about 250 to about 750 psi, temperatures in the range of from about 175° C. to 235° C. and a laminating cycle of from about 40 minutes to about 2 hours. The finished laminate may then be utilized to prepare printed circuit boards (PCB).

A number of manufacturing methods are available for preparing PCBs from laminates. Additionally, there is a myriad of possible end use applications including radios, televisions, computers, etc., for the PCB's. These methods and end uses are known in the art.

Referring now to FIG. 1 which is a flow sheet illustrating one embodiment of the inventive process, a copper leach dump 10 is treated in accordance with the inventive process to produce a copper metal powder which is collected in storage hoppers 40, 42 and 44. The process involves the use of settlers 14, 15 and 16, collection pond 17, mixers 18, 20 and 22, electrolytic cell 24 which includes interleaved cathodes 26 and anodes 28, endless belts 30 and 46, filter 32, rinse and dewater unit 34, storage hoppers 36, 38, 40, 42 and 44, powder spreading weir 45, furnace 48, cooling chamber 50, sinter cake breaker 52, mill 54, screen 58, and chutes 60, 62, 64, 66, 68 and 70. In this embodiment, step (A) of the inventive process is conducted at the leach dump 10. Steps (B) and (C) are conducted in two stages using mixers 18 and 20 and settlers 14 and 15. Steps (D) and (E) are conducted using mixer 22 and settler 16. Steps (F) and (G) are conducted using electrolytic cell 24.

Aqueous leach solution from line 70 is sprayed onto the surface of the leach dump 10. The leach solution is a sulfuric acid solution having a sulfuric acid concentration in the range of about 5 to about 50, more preferably about 5 to about 40 grams per liter, more preferably about 10 to about 30 grams per liter. The leach solution percolates down through the dump, dissolves copper in the ore, flows through the dump space 72 as a copper-rich aqueous leach solution (sometimes referred to as a pregnant leach solution), flows through line 74 into collection pond 17 and from there is pumped through line 76 into mixer 20. The copper-rich aqueous leach solution that is pumped into mixer 20 preferably has a copper ion concentration in the range of about 0.8 to about 5, more preferably about 1 to about 3 grams per liter; and a free sulfuric acid concentration in the range of about 5 to about 30, more preferably about 10 to about 20 grams per liter. In mixer 20 the copper-rich aqueous leach solution is mixed with a copper-bearing organic solution which is pumped into mixer 20 from weir 78 of settler 15 through lines 80, 82 and 84. The concentration of copper in the copper-bearing organic solution that is added to mixer 20 is preferably from about 0.5 to about 4 grams per liter of extractant in the organic solution, more preferably about 1 to about 2.4 grams per liter of extractant in the organic solution. During the mixing in mixer 20 an organic phase and an aqueous phase form and intermix. Copper ions transfer from the aqueous phase to the organic phase. The mixture is pumped from mixer 20 through line 86 to settler 14. In settler 14 the aqueous phase and organic phase separate with the organic phase forming the top layer and the aqueous phase forming the bottom layer. The organic phase collects in weir 88 and is pumped through lines 90, 92 and 94 to mixer 22. This organic phase is a copper-rich organic solution (which can be referred to as a loaded organic). This copper-rich organic solution preferably has a copper concentration in the range of about 1 to about 6 grams per liter of extractant in the organic solution, more preferably about 2 to about 4 grams per liter of extractant in the organic solution.

The copper-rich organic solution is mixed in mixer 22 with a copper-depleted stripping solution. The copper-depleted stripping solution (which can be referred to as a lean electrolyte) is produced in the electroforming cell 24 and is pumped through lines 96, 98, 100, 102, 104 and 106 to mixer 22. This copper-depleted stripping solution preferably has a free sulfuric acid concentration in the range of about 80 to about 300, more preferably about 150 to about 250 grams per liter; and a copper ion concentration in the range of preferably about 1 to about 50, more preferably about 4 to about 12 grams per liter. Fresh stripping solution make-up can be added to line 106 through line 108. The copper-rich organic solution and copper-depleted stripping solution are mixed in mixer 22 with the result being the formation of an organic phase intermixed with an aqueous phase. Copper ions transfer from the aqueous phase to the organic phase. The mixture is pumped from mixer 22 through line 110 to settler 16. In settler 16 the organic phase separates from the aqueous phase with the organic phase collecting in weir 112. This organic phase is a copper-depleted organic solution (which is sometimes referred to as a barren organic). This copper-depleted organic solution preferably has a copper concentration in the range of about 0.5 to about 2 grams per liter of extractant in the organic solution, more preferably about 0.9 to about 1.5 grams per liter of extractant in the organic solution. The copper depleted organic solution is pumped from settler 16 through lines 114, 116, 118 and 120 to mixer 18. Fresh organic solution make-up can be added to line 118 through line 122.

Copper-containing aqueous leach solution is pumped from settler 14 through lines 124, 126, 128 and 130 to mixer 18. This copper-containing aqueous leach solution preferably has a copper ion concentration in the range of about 0.4 to about 4, more preferably about 0.5 to about 2.4 grams per liter; and a free sulfuric acid concentration in the range of about 5 to about 50, more preferably about 5 to about 30 grams per liter, more preferably about 10 to about 20 grams per liter. In mixer 18 an organic phase and aqueous phase form, intermix and copper ions transfer from the aqueous phase to the organic phase. The mixture is pumped through line 132 to settler 15. In settler 15 the organic phase separates from the aqueous phase with the organic phase collecting in weir 78. This organic phase, which is a copper-containing organic solution, is pumped from settler 15 through lines 80, 82 and 84 to mixer 20. This copper-containing organic solution preferably has a copper concentration in the range of about 0.5 to about 4 grams per liter of extractant in the organic solution, more preferably about 1 to about 2.4 grams per liter of extractant in the organic solution. The aqueous phase in settler 15 is a copper-depleted aqueous leaching solution which is pumped through lines 134, 136 and 138 to line 70 wherein it is sprayed over the leach dump 10. Fresh leaching solution make-up can be added to line 138 through line 140.

The aqueous phase which separates out in settler 16 is a copper-rich stripping solution. It is pumped from settler 16 through lines 142 and 144 to filter 32 and from filter 32 through lines 146 and 148 to electrolytic cell 24. This copper-rich stripping solution preferably has a copper ion concentration in the range of about 2 to about 60, more preferably about 5 to about 15 grams per liter; and a free sulfuric acid concentration in the range of about 70 to about 290, more preferably about 140 to about 240 grams per liter. The copper-rich stripping solution entering electrolytic cell 24 can also be referred to as an electrolyte solution.

Electrolyte solution 150 in electrolytic cell 24 preferably has a copper ion concentration in the range of about 1 to about 60 grams per liter, more preferably about 4 to about 15 grams per liter; and a free sulfuric acid concentration in the range of about 70 to about 300, more preferably about 140 to about 250 grams per liter. The electrolyte solution 150 flows by natural convection between interleaved cathodes 26 and anodes 28. When voltage is applied between the anodes 28 and cathodes 26, electrodeposition of copper metal powder occurs on the cathodes. The electro-deposited copper powder 152 is removed from the cathodes 26 using a mechanical scraper (not shown in the drawing) and is conveyed along endless belt 30 to rinse and dewater unit 34.

The electrolyte solution 150 is converted to a copper-depleted electrolyte solution in electrolytic cell 24 and is withdrawn from cell 24 through line 96. The copper-depleted electrolyte solution in line 96 preferably has a copper ion concentration in the range of about 1 to about 50 grams per liter, more preferably about 4 to about 12 grams per liter; and a free sulfuric acid concentration in the range of about 80 to about 300, more preferably about 150 to about 250 grams per liter. This copper-depleted electrolyte is either: (1) recirculated through lines 96, 154, 156 and 148 back to cell 24; or (2) pumped through lines 96, 98, 100, 102, 104 and 106 to mixer 22 as the copper-depleted stripping solution.

Copper metal powder 152 is conveyed from electrolytic cell 24 to rinse and dewater unit 34 along endless belt 30. The powder 152 is rinsed and dewatered in unit 34. Rinse and dewater unit 34 can be, for example, a vacuum belt filter equipped with overhead spray nozzles for spraying the powder with water. The powder 152 is conveyed from unit 34 along endless belt 30 to chute 60 and into storage hopper 36. The powder 152 is conveyed from storage hopper 36 through powder spreading weir 45 to endless belt 46. The powder is spread on endless belt 46 and advanced through furnace 48 and cooling chamber 50 where it is dried and sintered to form a sinter cake. During this drying and sintering step, oxides that are picked up in the rinsing and dewatering unit 34 are reduced or eliminated. The sinter cake is conveyed from cooling chamber 50 along endless belt 46 to sinter cake breaker 52 and then deposited in storage hopper 38. The broken sinter cake is advanced from storage hopper 38 through chute 62 to mill 54. In mill 54 the broken sinter cake is further broken by crushing means such as a saw-toothed crusher. The broken particles can be further milled in, for example, a hammer mill or a plate mill (not shown in the drawing). The milled particles are advanced from mill 54 through chute 64 to screen 58 wherein they are separated into three sizes. Oversized particles are advanced through chute 66 to storage hopper 40. Undersized particles are advanced through chute 68 to storage hopper 42. The medium-sized particles are advanced through chute 70 to storage hopper 44. The oversized particles can be returned to mill 54 for further milling or they can be dissolved in electrolyte 150. The undersized particles in storage hopper 42 can be either dissolved in electrolyte 150 or blended with the medium-sized particles collected in storage hopper 44. Although screen 58 is depicted as separating the copper metal product into three-size fractions, those skilled in the art will recognize that additional fractions (e.g., four, five, six, etc.) can be separated without departing from the essence of the present invention.

Figure 2:
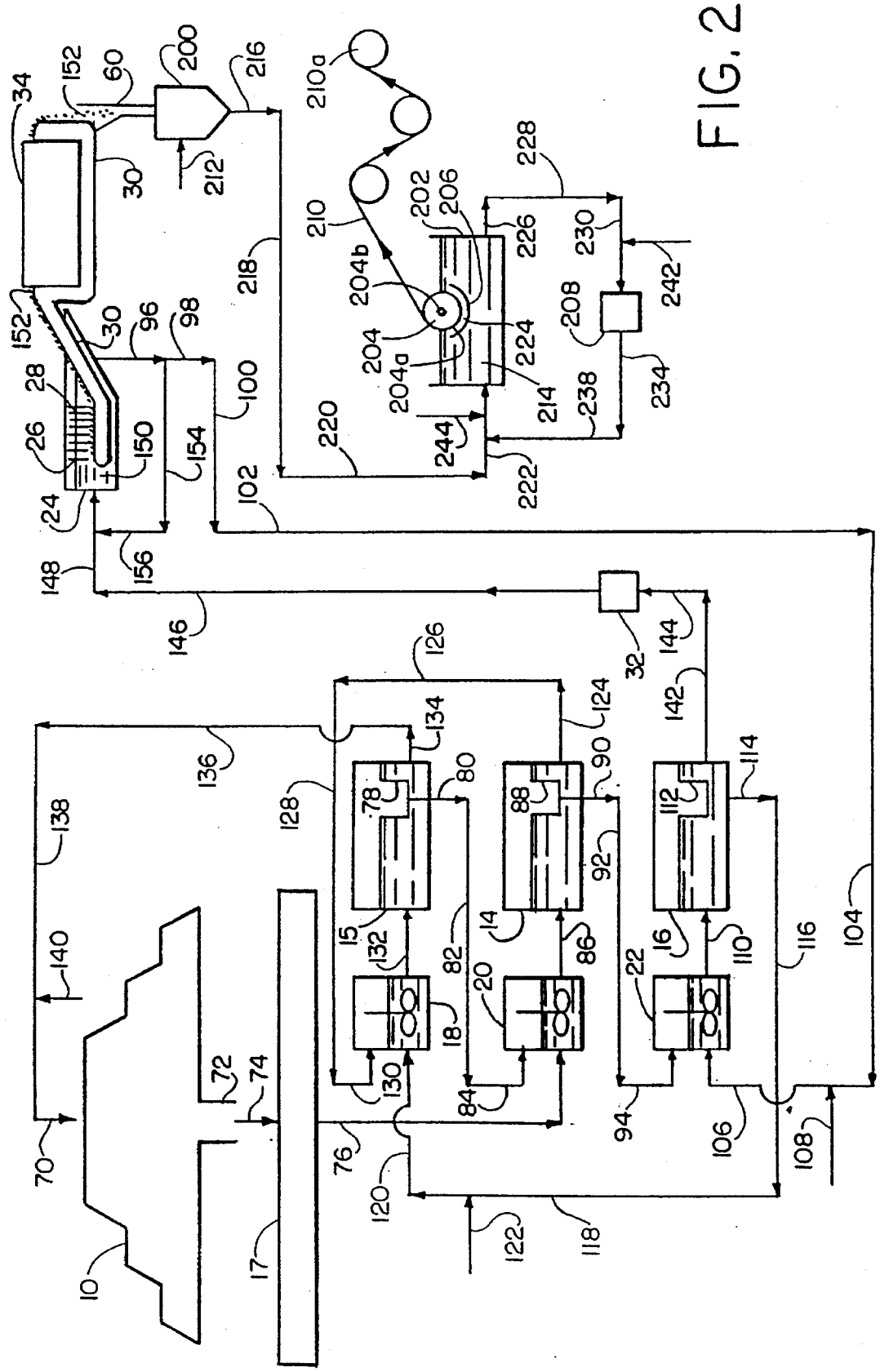
FIG. 2 is a flow sheet illustrating another embodiment of the process of the invention.

The embodiment depicted in FIG. 2 is identical to the embodiment depicted in FIG. 1 with the exception that the copper metal powder 152 conveyed from rinse and dewater unit 34 along endless belt 30 is advanced to digester 200 rather than storage hopper 36. The powder spreading weir 45, endless belt 46, furnace 48, cooling chamber 50, sinter cake breaker 52, storage hoppers 36, 38, 40, 42 and 44, mill 54, screen 58 and chutes 62, 64, 66, 68 and 70 depicted in FIG. 1 are replaced in FIG. 2 by electroforming cell 202 which includes rotating cylindrical cathode 204 and anode 206, and filter 208. Instead of making copper powder which is collected in storage hoppers 40, 42 and 44 of FIG. 1, the embodiment depicted in FIG. 2 involves making copper foil 2 10 which is collected as foil role 210a.

Referring to FIG. 2, the description provided above with respect to FIG. 1 is also applicable to FIG. 2 to the point where copper powder 152 is conveyed along endless belt 30 from rinse and dewater unit 34 to chute 60. In FIG. 2, the powder 152 advances through chute 60 to digester 200. In digester 200 the copper metal powder 152 is dissolved in sulfuric acid which is added to digester 200 through line 212. Optionally, spent electrolyte from electrolytic cell 24 or electroforming cell 202 can be added to digester 200 in addition to or in place of the sulfuric acid entering through line 212. In digester 200 an electrolyte solution 214 is formed and this electrolyte solution is pumped from digester 200 through lines 216, 218, 220 and 222 into electroforming cell 202. Electrolyte solution 214 preferably has a free sulfuric acid concentration in the range of about 70 to about 170 grams per liter, more preferably about 80 to about 170 grams per liter; and a copper ion concentration preferably in the range of about 40 to about 150 grams per liter, more preferably from about 90 to about 110 grams per liter. The electrolyte solution 214 flows in the gap 224 between rotating cathode 204 and anode 206. When voltage is applied between the anode 206 and cathode 204, electrodeposition of copper occurs at the cathode surface 204a. The electrodeposited copper is removed from cathode 204 as a continuous thin web of foil 210 as the cathode rotates. The copper foil is coiled in the form of foil roll 210a.

The electrolyte solution 214 is converted to a copper depleted electrolyte solution in electroforming cell 202 and is withdrawn from cell 202 through line 226. The copper-depleted electrolyte solution in line 226 preferably has a copper ion concentration in the range of about 40 to about 120, more preferably about 80 to about 100 grams per liter, more preferably about 90 to about 95 grams per liter; and a free sulfuric acid concentration in the range of about 80 to about 170, more preferably about 90 to about 120 grams per liter. This copper-depleted electrolyte is recirculated through lines 226, 228 and 230 to filter 208 and through filter 208 to lines 234, 238 and 222 and back to cell 202. Optionally, gelatin and/or other desirable additives of the type discussed above are added to the recirculating solution in line 230 through line 242. Active-sulfur containing material can be added to the recirculating solution in line 222 through line 244.

In the electroforming cell 202, electrical means that are well known in the art are provided for applying an electrical current between anode 206 and cathode 204. The current is preferably direct current or alternating current with a direct current bias. Copper ions in electrolyte solution 214 gain electrons at the peripheral surface 204a of cathode 204 whereby metallic copper plates out in the form of a foil layer. Cathode 204 rotates continuously about its axis 204b and the foil layer is continuously withdrawn from cathode surface 204a as a continuous web 210 which is collected as roll 210a.

The electrodeposition process in the electroforming cell 202 depletes the electrolyte solution 214 of copper ions, and, if used, gelatin and active-sulfur containing material. These ingredients are replenished, the copper ions being replenished through line 222, the gelatin being replenished through line 242, and the active-sulfur containing material being replenished through line 93.

Although the embodiments depicted in FIGS. 1 and 2 employ two-stage solvent extraction steps using mixers 18 and 20 and settlers 14 and 15, it is to be understood that additional extraction stages can be added to the process without departing from the essence of the invention. Thus, for example, while FIGS. 1 and 2 specifically discloses two-stage extraction steps, and the foregoing discussion refers to single-stage and two-stage extractions, the inventive process can be conducted using a three-stage, four-stage, five-stage, six-stage, etc., extraction step. Similarly, although the embodiments depicted in FIGS. 1 and 2 employ single-stage stripping steps using mixer 22 and settler 16, it is to be understood that additional stripping stages can be added to the process without departing from the essence of the invention. Thus, for example, the inventive process can be conducted using a two-stage, three-stage, four-stage, five-stage, six-stage, etc., stripping step.

The following examples are provided for purposes of illustrating the invention. Unless otherwise indicated, in the following examples as well as throughout the specification and claims, all parts and percentages are by weight, all temperatures are in degrees centigrade, and all pressures are atmospheric.

EXAMPLES 1–12

Copper metal powder is prepared using the process illustrated in FIG. 1 with the exception that the electrolytic cell 24, endless belt 30, rinse and dewater unit 34, storage hoppers 36, 38, 40, 42 and 44, chutes 60, 62, 64, 66, 68 and 70, powder spread weir 45, furnace 48, cooling chamber 50, sinter cake breaker 52, mill 54 and screen 58 are not used. The electrolytic cell that is used is a 54.25×48×14-inch polypropylene tank containing three anodes and two cathodes. The anodes are lead-calcium-tin alloy anodes. The cathodes are stainless steel. A head tank is used to hold the electrolyte solution. The electrolyte solution is gravity fed to the electrolytic cell.

The aqueous leaching solution sprayed onto the leach dump 10 from line 70 is an aqueous sulfuric acid solution having a free sulfuric acid concentration of 20 grams per liter. The copper-rich aqueous leach solution that is pumped to mixer 20 through line 76 has a copper ion concentration of 1.8 grams per liter and a free sulfuric acid concentration of 12 grams per liter. The organic solution is a 7% by weight solution of LIX 984 in SX-7. The concentration of copper in the copper-bearing organic solution that is added to mixer 20 from settler 15 has a copper concentration of 1.95 grams per liter of LIX 984 in the organic solution. The copper-rich organic solution that is pumped to mixer 22 from settler 14 has a copper concentration of 3 grams per liter of LIX 984 in the organic solution. The copper-depleted stripping solution added to mixer 22 from line 106 has a free sulfuric acid concentration of 170 grams per liter and a copper ion concentration of 40 grams per liter. (This copper-depleted stripping solution is pumped through line 106 to mixer 22 from an EW facility which is not part of the inventive process.) The copper-depleted organic solution that is pumped from settler 16 to mixer 18 has a copper concentration of 1.25 grams per liter of LIX 984 in the organic

EXAMPLES 13–15

The procedure used in Examples 13–15 is the same as used in Examples 1–12 except that: (1) deionized water is used in place of tap water to rinse the samples; (2) two of three cycles for each example are run using a dimensionally stable anode and one is run using a lead anode, rather than running all three cycles using lead anodes; and (3) stainless steel or plastic scrapers are used in place of carbon steel scrapers. The results are also indicated in Table I.

TABLE I

| Example | Current Density (ASF) | Electrolyte Cu (g/l)[1] | Electrolyte Acid (g/l)[2] | Temp. (°F.)[3] | Volts | Efficiency (%) | Copper (Wt. %) | Purity (%) | Overall Eff. (%) | Oxygen (Wt. %) | Sulfur (ppm) | % Cl |
|---|---|---|---|---|---|---|---|---|---|---|---|---|
| 1 | 90 | 5 | 150 | 110 | 4.0 | 77.1 | 82 | 99.682 | 63.0 | 7.40 | 31 | 0.100 |
| 2 | 90 | 15 | 150 | 90 | 3.7 | 87.9 | 96 | 99.990 | 84.4 | 6.80 | 67 | 0.019 |
| 3 | 30 | 5 | 150 | 90 | 3.0 | 97.1 | 86 | 99.971 | 83.5 | 9.70 | 28 | 0.110 |
| 4 | 90 | 5 | 200 | 90 | 4.0 | 69.7 | 83 | 99.936 | 57.8 | 2.20 | 10 | 0.170 |
| 5 | 60 | 10 | 175 | 100 | 3.0 | 91.2 | 93 | 99.977 | 84.8 | 1.80 | 29 | 0.036 |
| 6 | 30 | 15 | 150 | 110 | 2.5 | 53.4 | 96 | 99.967 | 51.2 | 0.15 | 63 | 0.012 |
| 7 | 60 | 10 | 175 | 100 | 3.0 | 96.2 | 94 | 99.981 | 90.4 | 1.40 | 14 | 0.024 |
| 8 | 90 | 15 | 200 | 110 | 4.1 | 81.3 | 95 | 99.984 | 77.2 | 0.56 | 74 | 0.018 |
| 9 | 140 | 40 | 170 | 110 | 4.2 | 82.1 | 96 | 99.986 | 78.8 | 0.21 | 53 | 0.019 |
| 10 | 60 | 10 | 175 | 100 | 3.1 | 93.4 | 93 | 99.968 | 86.8 | 1.80 | 25 | 0.022 |
| 11 | 30 | 5 | 200 | 110 | 3.0 | 96.1 | 87 | 99.955 | 83.6 | 5.90 | 12 | 0.029 |
| 12 | 30 | 15 | 200 | 90 | 2.5 | 81.6 | 95 | 99.937 | 77.5 | 0.31 | 87 | 0.037 |
| 13 | 60 | 10 | 175 | 100 | 6.0 | 86.5 | 90 | 99.976 | 77.8 | 6.94 | 98 | 0.017 |
| 14 | 60 | 10 | 175 | 100 | 3.2 | 82.7 | 96 | 99.955 | 79.4 | 1.13 | 96 | 0.026 |
| 15 | 60 | 10 | 175 | 100 | 3.3 | 79.0 | 94 | 99.974 | 74.2 | 2.10 | 52 | 0.016 |

[1]Copper ion concentration of electrolyte in grams per liter.
[2]Free sulfuric acid concentration of electrolyte in grams per liter.
[3]Temperature of electrolyte in °F.

solution. The copper-containing aqueous leach solution pumped from settler 14 to mixer 18 has a copper ion concentration of 0.8 grams per liter and a free sulfuric acid concentration of 12 grams per liter. The copper-depleted aqueous solution pumped from settler 15 through line 134 has a copper concentration of 0.15 grams per liter and a free sulfuric acid concentration of 12 grams per liter. The copper-rich stripping solution taken from settler 16 for use in the electrolytic cell is diluted with water and sulfuric acid to provide copper ion concentrations of 5–15 grams per liter and free sulfuric acid concentrations of 150–200 grams per liter as indicated in Table (I) below. The copper-rich stripping solution for Example 9 was not diluted.

The electrolytic cell is permitted to reach equilibrium by running the cell at the test conditions and allowing the cell to equilibrate, 20 minutes for current densities of 90 and 145 amps per square foot (ASF), 40 minutes for current density of 60 ASF and 60 minutes for current density of 30 ASF. For each example, three 45-minute cycles are conducted. At the end of each cycle the cathode is scraped using a carbon steel scraper. The copper metal powder is collected in a stainless steel pan. The powder is rinsed using tap water in a plastic bucket and the water is decanted. This rinse procedure is repeated four more times. The powder is treated with a 1% by weight benzotriazole solution for one hour and dried. The powder is analyzed with the results being indicated in Table I below. The percent copper of the sample is determined by weighing out one gram of powder and dissolving the sample in $HNO_3$, and analyzing it for copper content. The efficiency is calculated from the dry weight. The overall efficiency is calculated as the overall product of purity, percent copper and dry weight efficiency.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for making copper foil from a copper-bearing material selected from the group consisting of copper ore, smelter flue dust, copper cement and copper-containing waste, said process comprising:

(A) contacting said copper-bearing material with an effective amount of at least one aqueous leaching solution to dissolve copper ions in said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution; said extractant comprising (i) at least one oxime characterized by a hydrocarbon linkage with at least one —OH group and at least one =NOH group attached to different carbon atoms on said hydrocarbon linkage, (ii) at least one betadiketone, or (iii) at least one ion-exchange resin;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant to form a first electrolyte solution;

(F) advancing said first electrolyte solution into an electrolytic cell equipped with at least one first insoluble anode and at least one first cathode, and applying an effective amount of voltage across said first anode and said first cathode to deposit copper metal powder on said first cathode, said first electrolyte solution containing impurities carried over from one or more of said contacting steps;

(G) removing copper metal powder from said first cathode;

(H) dissolving said copper powder from step (G) in an aqueous sulfuric acid solution to form a second electrolyte solution;

(I) flowing said second electrolyte solution in an electroforming cell between a second anode and a second cathode, said second cathode being a rotating cathode, and applying an effective amount of voltage across said second anode and said second cathode to deposit copper foil on said second cathode, said second electrolyte solution being characterized by the addition of one or more of an active-sulfur containing material, a gelatin, molasses, guar gum, a polyalkylene glycol, dithiothreitol, an amino acid, acrylamide, sulfopropyl disulfide, tetraethylthiuram disulfide, benzyl chloride, epichlorohydrin, chlorohydroxylpropyl sulfonate, an alkylene oxide, a sulfonium alkane sulfonate, thiocarbamoyldisulfide, selenic acid, or a mixture of two or more thereof; and (J) removing said copper foil from said second cathode.

2. The process of claim 1 with the step of separating said copper-rich aqueous solution formed in step (A) from said copper-bearing material.

3. The process of claim 1 wherein said aqueous leaching solution comprises sulfuric acid or ammonia.

4. The process of claim 1 wherein said extractant in step (B) comprises at least one compound represented by the formula

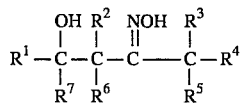

wherein $R^1$, $R^2$, $R^3$, $R^4$, $R^5$, $R^6$ and $R^7$ are independently hydrogen or hydrocarbyl groups.

5. The process of claim 1 wherein said extractant in step (B) comprises at least one compound represented by the formula

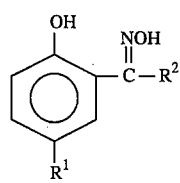

wherein $R^1$ and $R^2$ are independently hydrogen or hydrocarbyl groups.

6. The process of claim 1 wherein said extractant in step (B) comprises at least one compound represented by the formula

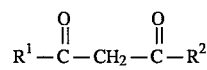

wherein $R^1$ and $R^2$ are independently alkyl groups or aryl groups.

7. The process of claim 1 wherein said ion exchange resin is a copolymer of styrene and divinylbenzene characterized by the presence of at least one functional group selected from $-SO_3^-$, $-COO^-$,

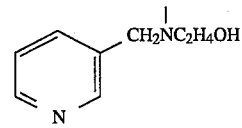

and

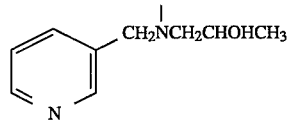

8. The process of claim 1 wherein said first electrolyte solution formed in step (E) has a copper ion concentration in the range of about 2 to about 60 grams per liter and a free sulfuric acid concentration in the range of about 70 to about 290 grams per liter.

9. The process of claim 1 wherein said second electrolyte solution has a copper ion concentration in the range of about 40 to about 150 grams per liter and a free sulfuric acid concentration in the range of about 70 to about 170 grams per liter.

10. The process of claim 1 with the step of applying to at least one side of said foil from step (J) at least one roughened layer of copper or copper oxide.

11. The process of claim 1 with the step of applying to at least one side of said foil from step (J) at least one metallic layer, the metal in said metallic layer being selected from the group consisting of indium, zinc, tin, nickel, cobalt, copper-zinc alloy and copper-tin alloy.

12. The process of claim 1 with the step of applying to at least one side of said foil from step (J) at least one metallic layer, the metal in said metallic layer being selected from the group consisting of tin, chromium, and chromium-zinc alloy.

13. The process of claim 1 with the steps of applying to at least one side of said foil from step (J) at least one roughened layer of copper or copper oxide, then applying to said roughened layer at least one first metallic layer, the metal in said first metallic layer being selected from the group consisting of indium, zinc, tin, nickel, cobalt, copper-zinc alloy and copper-tin alloy, then applying to said first metallic layer at least one second metallic layer, the metal in said second metallic layer being selected from the group consisting of tin, chromium, and chromium-zinc alloy.

14. A process for making copper foil directly from a copper-bearing material selected from the group consisting of copper ore, smelter flue dust, copper cement and copper-containing waste, said process comprising:

(A) contacting said copper-bearing material with an effective amount of at least one aqueous leaching solution to dissolve copper ions in said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution; said extractant comprising (i) at least one oxime characterized by a hydrocarbon linkage with at least one —OH group and at least one =NOH group attached to different carbon atoms on said hydrocarbon linkage, (ii) at least one betadiketone, or (iii) at least one ion-exchange resin;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant to form a first electrolyte solution;

(F) advancing said first electrolyte solution into an electrolytic cell equipped with at least one first insoluble anode and at least one first cathode, and applying an effective amount of voltage across said first anode and said first cathode to deposit copper metal powder on said first cathode, said first electrolyte solution containing impurities carried over from one or more of said contacting steps;

(G) removing copper metal powder from said first cathode;

(H') calcining said copper metal powder from step (G) to form cupric oxide, cuprous oxide, or a mixture thereof;

(H) dissolving said cupric oxide, cuprous oxide or mixture thereof in an aqueous sulfuric acid solution to form a second electrolyte solution;

(I) flowing said second electrolyte solution in an electroforming cell between a second anode and a second cathode, said second cathode being a rotating cathode, and applying an effective amount of voltage across said second anode and said second cathode to deposit copper foil on said second cathode, said second electrolyte solution being characterized by the addition of one or more of an active-sulfur containing material, a gelatin, molasses, guar gum, a polyalkylene glycol, dithiothreitol, an amino acid, acrylamide, sulfopropyl disulfide, tetraethylthiuram disulfide, benzyl chloride, epichlorohydrin, chlorohydroxylpropyl sulfonate, an alkylene oxide, a sulfonium alkane sulfonate, thiocarbamoyldisulfide, selenic acid, or a mixture of two or more thereof; and (J) removing copper foil from said second cathode.

15. The process of claim 14 wherein said second electrolyte solution has a copper ion concentration in the range of about 40 to about 150 grams per liter and a free sulfuric acid concentration in the range of about 70 to about 170 grams per liter.

16. The process of claim 14 with the step of applying to at least one side of said foil from step (J) at least one roughened layer of copper or copper oxide.

17. The process of claim 14 with the step of applying to at least one side of said foil from step (J) at least one metallic layer, the metal in said metallic layer being selected from the group consisting of indium, zinc, tin, nickel, cobalt, copper-zinc alloy and copper-tin alloy.

18. The process of claim 14 with the step of applying to at least one side of said foil from step (J) at least one metallic layer, the metal in said metallic layer being selected from the group consisting of tin, chromium, and chromium-zinc alloy.

19. The process of claim 14 with the steps of applying to at least one side of said foil from step (J) at least one roughened layer of copper or copper oxide, then applying to said toughened layer at least one first metallic layer, the metal in said first metallic layer being selected from the group consisting of indium, zinc, tin, nickel, cobalt, copper-zinc alloy and copper-tin alloy, then applying to said first metallic layer at least one second metallic layer, the metal in said second metallic layer being selected from the group consisting of tin, chromium, and chromium-zinc alloy.

20. The process of claim 14 with the step of separating said copper-rich aqueous solution formed in step (A) from said copper-bearing material.

21. The process of claim 14 wherein said aqueous leaching solution comprises sulfuric acid or ammonia.

22. The process of claim 14 wherein said extractant in step (B) comprises at least one compound represented by the formula

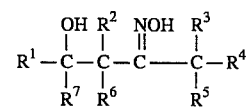

wherein $R^1$, $R^2$, $R^3$, $R^4$, $R^5$, $R^6$ and $R^7$ are independently hydrogen or hydrocarbyl groups.

23. The process of claim 14 wherein said extractant in step (B) comprises at least one compound represented by the formula

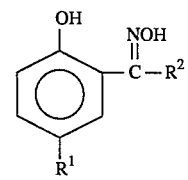

wherein $R^1$ and $R^2$ are independently hydrogen or hydrocarbyl groups.

24. The process of claim 14 wherein said extractant in step (B) comprises at least one compound represented by the formula

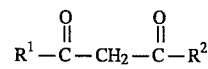

wherein $R^1$ and $R^2$ are independently alkyl groups or aryl groups.

25. The process of claim 14 wherein said ion exchange resin is a copolymer of styrene and divinylbenzene characterized by the presence of at least one functional group selected from $—SO_3^-$, $—COO^-$,

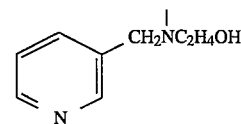

-continued and

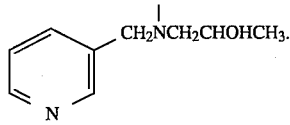

26. The process of claim 14 wherein said first electrolyte solution formed in step (E) has a copper ion concentration in the range of about 2 to about 60 grams per liter and a free sulfuric acid concentration in the range of about 70 to about 290 grams per liter.

27. A process for making cupric oxide, cuprous oxide or a mixture thereof directly from a copper-bearing material selected from the group consisting of copper ore, smelter flue dust, copper cement and copper-containing waste, said process comprising:

(A) contacting said copper-bearing material with an effective amount of at least one aqueous leaching solution to dissolve copper ions in said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution; said extractant comprising (i) at least one oxime characterized by a hydrocarbon linkage with at least one —OH group and at least one =NOH group attached to different carbon atoms on said hydrocarbon linkage, (ii) at least one betadiketone, or (iii) at least one ion-exchange resin;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant to form a first electrolyte solution;

(F) advancing said first electrolyte solution into an electrolytic cell equipped with at least one first insoluble anode and at least one first cathode, and applying an effective amount of voltage across said first anode and said first cathode to deposit copper metal powder on said first cathode, said first electrolyte solution containing impurities carried over from one or more of said contacting steps;

(G) removing copper metal powder from said first cathode; and (H') calcining said copper metal powder from step (G) to form cupric oxide, cuprous oxide, or a mixture thereof.

28. The process of claim 24 with the step of separating said copper-rich aqueous solution formed in step (A) from said copper-bearing material.

29. The process of claim 24 wherein said aqueous leaching solution comprises sulfuric acid or ammonia.

30. The process of claim 24 wherein said extractant in step (B) comprises at least one compound represented by the formula

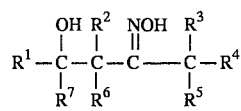

wherein $R^1$, $R^2$, $R^3$, $R^4$, $R^5$, $R^6$ and $R^7$ are independently hydrogen or hydrocarbyl groups.

31. The process of claim 24 wherein said extractant in step (B) comprises at least one compound represented by the formula

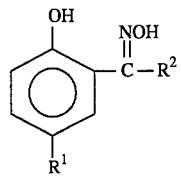

wherein $R^1$ and $R^2$ are independently hydrogen or hydrocarbyl groups.

32. The process of claim 24 wherein said extractant in step (B) comprises at least one compound represented by the formula

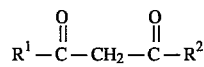

wherein $R^1$ and $R^2$ are independently alkyl groups or aryl groups.

33. The process of claim 24 wherein said ion exchange resin is a copolymer of styrene and divinylbenzene characterized by the presence of at least one functional group selected from —$SO_3^-$, —$COO^-$,

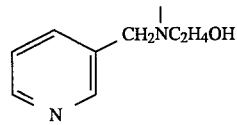

and

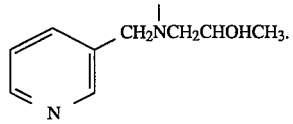

34. The process of claim 24 wherein said first electrolyte solution formed in step (E) has a copper ion concentration in the range of about 2 to about 60 grams per liter and a free sulfuric acid concentration in the range of about 70 to about 290 grams per liter.

35. A process for making copper foil directly from a copper-bearing material selected from the group consisting of copper ore, smelter flue dust, copper cement and copper-containing waste, said process including sequential steps (A), (B-1), (C-1), (B-2), (C-2), (D), (E), (F), (G), (H), (I) and (J), said process comprising:

(A) contacting said copper-bearing material with an effective amount of at least one aqueous leaching solution to dissolve copper ions in said leaching solution and form a copper-rich aqueous leaching solution;

(B-1) contacting said copper-rich aqueous leaching solution from step (A) with an effective amount of at least one copper-bearing water-insoluble extractant from step (C-2) to transfer copper ions from said copper-rich aqueous leaching solution to said copper-bearing extractant to form a copper-rich extractant and a first copper-depleted aqueous leaching solution; said extractant comprising (i) at least one oxime characterized by a hydrocarbon linkage with at least one —OH group and at least one =NOH group attached to different carbon atoms on said hydrocarbon linkage, (ii) at least one betadiketone, or (iii) at least one ion-exchange resin;

(C-1) separating said copper-rich extractant from said first copper-depleted aqueous leaching solution, advancing said copper-rich extractant to step (D);

(B-2) contacting said first copper-depleted aqueous leaching solution from step (C-1) with an effective amount of at least one copper-depleted extractant from step (E) to transfer copper ions from said first copper-depleted aqueous leaching solution to said copper-depleted extractant to form a copper-bearing extractant and a second copper-depleted aqueous leaching solution;

(C-2) separating said copper-bearing extractant from said second copper-depleted aqueous leaching solution, recirculating said copper-bearing extractant to step (B-1);

(D) contacting said copper-rich extractant from step (C-1) with an effective amount of at least one aqueous stripping solution to transfer copper ions from said copper-rich extractant to said stripping solution to form a first electrolyte solution and a copper-depleted extractant;

(E) separating said first electrolyte solution from said copper-depleted extractant, recirculating said copper-depleted extractant to step (B-2);

(F) advancing said first electrolyte solution from step (E) to an electrolytic cell equipped with at least one first insoluble anode and at least one first cathode, and applying an effective amount of voltage across said first anode and said first cathode to deposit copper powder on said first cathode, said first electrolyte solution containing impurities carried over from one or more of said contacting steps;

(G) removing copper powder from said first cathode;

(H) dissolving said copper powder from step (G) in a sulfuric acid solution to form a second electrolyte solution and placing said second electrolyte solution in an electroforming cell equipped with a second anode and a second cathode, said second cathode being a rotating cathode, said second electrolyte solution being characterized by the addition of one or more of an active-sulfur containing material, a gelatin, molasses, guar gum, a polyalkylene glycol, dithiothreitol, an amino acid, acrylamide, sulfopropyl disulfide, tetraethylthiuram disulfide, benzyl chloride, epichlorohydrin, chlorohydroxylpropyl sulfonate, an alkylene oxide, a sulfonium alkane sulfonate, thiocarbamoyldisulfide, selenic acid, or a mixture of two or more thereof;

(I) flowing said second electrolyte solution between said second anode and second cathode, and applying an effective amount of voltage across said second anode and second cathode to deposit copper foil on said second cathode; and (J) removing said copper foil from said second cathode.

36. (Amended) A process for making cuprous oxide, cupric oxide or a mixture thereof directly from a copper-bearing material selected from the group consisting of copper ore, smelter flue dust, copper cement and copper-containing waste, said process including sequential steps (A), (B-1), (C-1), (B-2), (C-2), (D), (E), (F), (G) and (H'), said process comprising:

(A) contacting said copper-bearing material with an effective amount of at least one aqueous leaching solution to dissolve copper ions in said leaching solution and form a copper-rich aqueous leaching solution;

(B-1) contacting said copper-rich aqueous leaching solution from step (A) with an effective amount of at least one copper-bearing water-insoluble extractant from step (C-2) to transfer copper ions from said copper-rich aqueous leaching solution to said copper-bearing extractant to form a copper-rich extractant and a first copper-depleted aqueous leaching solution; said extractant comprising (i) at least one oxime characterized by a hydrocarbon linkage with at least one —OH group and at least one =NOH group attached to different carbon atoms on said hydrocarbon linkage, (ii) at least one betadiketone, or (iii) at least one ion-exchange resin;

(C-1) separating said copper-rich extractant from said first copper-depleted aqueous leaching solution, advancing said copper-rich extractant to step (D);

(B-2) contacting said first copper-depleted aqueous leaching solution from step (C-1) with an effective amount of at least one copper-depleted extractant from step (E) to transfer copper ions from said first copper-depleted aqueous leaching solution to said copper-depleted extractant to form a copper-bearing extractant and a second copper-depleted aqueous leaching solution;

(C-2) separating said copper-bearing extractant from said second copper-depleted aqueous leaching solution, recirculating said copper-bearing extractant to step (B-1);

(D) contacting said copper-rich extractant from step (C-1) with an effective amount of at least one aqueous stripping solution to transfer copper ions from said copper-rich extractant to said stripping solution to form a first electrolyte solution and a copper-depleted extractant;

(E) separating said first electrolyte solution from said copper-depleted extractant, recirculating said copper-depleted extractant to step (B-2);

(F) advancing said first electrolyte solution from step (E) into an electrolytic cell equipped with at least one first insoluble anode and at least one first cathode, and applying an effective amount of voltage across said first anode and said first cathode to deposit copper metal powder on said first cathode, said first electrolyte solution containing impurities carried over from one or more of said contacting steps;

(G) removing copper metal powder from said first cathode; and (H') calcining said copper metal powder at a sufficient temperature and for an effective period of time to form cuprous oxide, cupric oxide or a mixture thereof.

37. A process for making copper foil directly from a copper-bearing material selected from the group consisting of copper ore, smelter flue dust, copper cement and copper-containing waste, said process including sequential steps (A), (B-1), (C-1), (B-2), (C-2), (D), (E), (F), (G), (H'), (H), (I) and (J), said process comprising:

(A) contacting said copper-bearing material with an effective amount of at least one aqueous leaching solution to dissolve copper ions in said leaching solution and form a copper-rich aqueous leaching solution;

(B-1) contacting said copper-rich aqueous leaching solution from step (A) with an effective amount of at least one copper-bearing water-insoluble extractant from step (C-2) to transfer copper ions from said copper-rich aqueous leaching solution to said copper-bearing extractant to form a copper-rich extractant and a first copper-depleted aqueous leaching solution; said extractant comprising (i) at least one oxime characterized by a hydrocarbon linkage with at least one —OH group and at least one =NOH group attached to different carbon atoms on said hydrocarbon linkage, (ii) at least one betadiketone, or (iii) at least one ion-exchange resin;

(C-1) separating said copper-rich extractant from said first copper-depleted aqueous leaching solution, advancing said copper-rich extractant to step (D);

(B-2) contacting said first copper-depleted aqueous leaching solution from step (C-1) with an effective amount of at least one copper-depleted extractant from step (E) to transfer copper ions from said first copper-depleted aqueous leaching solution to said copper-depleted extractant to form a copper-bearing extractant and a second copper-depleted aqueous leaching solution;

(C-2) separating said copper-bearing extractant from said second copper-depleted aqueous leaching solution, recirculating said copper-bearing extractant to step (B-1);

(D) contacting said copper-rich extractant from step (C-1) with an effective amount of at least one aqueous stripping solution to transfer copper ions from said copper-rich extractant to said stripping solution to form a first electrolyte solution and a copper-depleted extractant;

(E) separating said first electrolyte solution from said copper-depleted extractant, recirculating said copper-depleted extractant to step (B-2);

(F) advancing said first electrolyte solution from step (E) into an electrolytic cell equipped with at least one first insoluble anode and at least one first cathode, and applying an effective amount of voltage across said first anode and said first cathode to deposit copper metal powder on said first cathode, said first electrolyte solution containing impurities carded over from one or more of said contacting steps;

(G) removing copper metal powder from said first cathode;

(H') calcining said copper metal powder to form cuprous oxide, cupric oxide or a mixture thereof; and (H) dissolving said cuprous oxide, cupric oxide or mixture thereof from step (H') in a sulfuric acid solution to form a second electrolyte solution and placing said second electrolyte solution in an electroforming cell equipped with a second anode and a second cathode, said second cathode being a rotating cathode, said second electrolyte solution being characterized by the addition of one or more of an active-sulfur containing material, a gelatin, molasses, guar gum, a polyalkylene glycol, dithiothreitol, an amino acid, acrylamide, sulfopropyl disulfide, tetraethylthiuram disulfide, benzyl chloride, epichlorohydrin, chlorohydroxylpropyl sulfonate, an alkylene oxide, a sulfonium alkane sulfonate, thiocarbamoyldisulfide, selenic acid, or a mixture of two or more thereof;

(I) flowing said second electrolyte solution between said second anode and second cathode, and applying an effective amount of voltage across said second anode and second cathode to deposit copper foil on said second cathode; and (J) removing said copper foil from said second cathode.

* * * * *

UNITED STATES PATENT AND TRADEMARK OFFICE
CERTIFICATE OF CORRECTION

PATENT NO. : 5,458,746

DATED : October 17, 1995

INVENTOR(S) : Burgess, et al.

It is certified that error appears in the above-indentified patent and that said Letters Patent is hereby corrected as shown below:

Col. 27, claim 28, line 60, delete "24" and substitute -- 27 -- .

Col. 27, claim 29, line 63, delete "24" and substitute -- 27 -- .

Col. 27, claim 30, line 65, delete "24" and substitute -- 27 -- .

Col. 28, claim 31, line 9, delete, "24" and substitute -- 27 -- .

Col. 28, claim 32, line 24, delete, "24" and substitute -- 27 -- .

Col. 28, claim 33, line 34, delete, "24" and substitute -- 27 -- .

Col. 28, claim 34, line 53, delete, "24" and substitute -- 27 -- .

Col. 30, claim 36, line 1, delete, "(Amended)".

Signed and Sealed this

Fourteenth Day of May, 1996

Attest:

BRUCE LEHMAN

*Attesting Officer*  *Commissioner of Patents and Trademarks*